United States Patent
Chang et al.

(10) Patent No.: US 10,097,967 B2
(45) Date of Patent: *Oct. 9, 2018

(54) MOBILE COMMUNICATION METHOD, MOBILE TERMINAL, RADIO BASE STATION, AND PROGRAM

(71) Applicant: KYOCERA CORPORATION, Kyoto (JP)

(72) Inventors: Henry Chang, San Diego, CA (US); Noriyoshi Fukuta, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/813,034

(22) Filed: Nov. 14, 2017

(65) Prior Publication Data

US 2018/0091956 A1   Mar. 29, 2018

Related U.S. Application Data

(63) Continuation of application No. 14/238,456, filed as application No. PCT/JP2012/070451 on Aug. 10, 2012, now Pat. No. 9,820,109.

(Continued)

(51) Int. Cl.
*H04W 4/06* (2009.01)
*H04W 36/04* (2009.01)
*H04W 84/04* (2009.01)

(52) U.S. Cl.
CPC ............. *H04W 4/06* (2013.01); *H04W 36/04* (2013.01); *H04W 84/045* (2013.01)

(58) Field of Classification Search
CPC ...... H04W 4/06; H04W 36/04; H04W 84/045
See application file for complete search history.

(56) References Cited

U.S. PATENT DOCUMENTS

| 8,254,932 B2 | 8/2012 | Hsu |
| 8,310,919 B2 | 11/2012 | Worrall |

(Continued)

FOREIGN PATENT DOCUMENTS

| EP | 1635597 A2 | 3/2006 |
| EP | 2303969 A1 | 4/2011 |

(Continued)

OTHER PUBLICATIONS

Communication pursuant to Article 94(3) EPC issued by the European Patent Office dated Nov. 10, 2017, which corresponds to European Patent Application No. 12 824 351.6-1854 and is related to U.S. Appl. No. 14/238,456.

(Continued)

*Primary Examiner* — Phuc Tran
(74) *Attorney, Agent, or Firm* — Studebaker & Brackett PC

(57) ABSTRACT

A mobile communication method is a method for distributing MBMS data to a mobile terminal in a mobile communication system including a general cell supporting a broadcasting of the MBMS data and a specific cell not supporting the broadcasting of the MBMS data, comprising: a step A of determining whether or not to continue a reception of the MBMS data in the general cell, based on at least one of an operation state of the general specific cell and a state of service with which the mobile terminal is provided by the general cell, when the mobile terminal receives, in a connected state, the MBMS data broadcasted from the general cell in a connected state.

3 Claims, 8 Drawing Sheets

OPTION 2:MBMS STATUS INFO SENT WITH PROXIMITY INDICATION

Related U.S. Application Data

(60) Provisional application No. 61/645,983, filed on May 11, 2012, provisional application No. 61/523,140, filed on Aug. 12, 2011.

(56) References Cited

U.S. PATENT DOCUMENTS

| | | | |
|---|---|---|---|
| 8,472,364 | B2 | 6/2013 | Hu et al. |
| 8,830,895 | B2 | 9/2014 | Wang et al. |
| 8,908,713 | B2 | 12/2014 | Liu et al. |
| 9,820,109 | B2 * | 11/2017 | Chang ............... H04W 4/06 |
| 2004/0166863 | A1 | 8/2004 | Kim et al. |
| 2007/0015530 | A1 | 1/2007 | Ding |
| 2010/0265867 | A1 | 10/2010 | Becker et al. |
| 2011/0077006 | A1 | 3/2011 | Hsu |
| 2011/0305184 | A1 | 12/2011 | Hsu |
| 2013/0051306 | A1 | 2/2013 | Gou et al. |
| 2013/0142072 | A1 | 6/2013 | Xu et al. |
| 2013/0229974 | A1 | 9/2013 | Xu et al. |
| 2014/0169253 | A1 | 6/2014 | Chun et al. |
| 2014/0198711 | A1 | 7/2014 | Chang et al. |

FOREIGN PATENT DOCUMENTS

| | | |
|---|---|---|
| EP | 2696607 A1 | 2/2014 |
| JP | 2010-157918 A | 7/2010 |
| WO | 2009/043389 A1 | 4/2009 |
| WO | 2009/156150 A1 | 12/2009 |
| WO | 2013/024805 A1 | 2/2013 |

OTHER PUBLICATIONS

Communication pursuant to Article 94(3) EPC issued by the European Patent Office dated Nov. 10, 2017, which corresponds to European Patent Application No. 17 162 342.4-1854 and is related to U.S. Appl. No. 14/238,456.

Communication pursuant to Article 94(3) EPC issued by the European Patent Office dated May 15, 2017, which corresponds to European Patent Application No. 12 824 351.6-1854 and is related to U.S. Appl. No. 14/238,456.

Alcatel-Lucent Shanghai Bell et al.; "Neighbouring cells MBSFN area information exchange in M2AP for MBMS service continuity"; 3GPP TSG-RAN WG3 Meeting #72; R3-111333; May 9-13, 2011; pp.1-4; Barcelona, Spain.

Kyocera, "MBMS service continuity for inbound mobility to CSG cells," 3GPP TSG-RAN WG2 #75bis, R2-115190, Zhuhai, China, Oct. 10-14, 2011,4 pp.

European Search Report (ESR) dated May 30, 2017, from corresponding EP Appl No. 17162342.4, 8 pp.

An Office Action; "Notice of Reasons for Rejection," issued by the Japanese Patent Office dated Apr. 5, 2016, which corresponds to Japanese Patent Application No. 2015-086434 and is related to U.S. Appl. No. 14/238,456; with English language statement of relevance.

Huawai; "Service continuity in connected mode and location information for MBMS for L TE"; 3GPP; TSG-RAN Meeting 51; RP-110452; Mar. 15-18, 2011; Kansas City, USA.

An Office Action; "Notice of Reasons for Rejection," issued by the Japanese Patent Office dated Apr. 8, 2014, which corresponds to Japanese Patent Application No. 2013-529003 and is related to U.S. Appl. No. 14/238,456; with English language statement of relevance.

LG Electronics Inc.; 3GPP TSG-RAN WG2 #74; "Mobility between a MBMS cell and a CSG cell"; Barcelona, Spain; May 9-13, 2011; R2-113336; pp 1-2.

International Search Report; PCT/JP2012/070451; dated Sep. 11, 2012.

3GPP TS 36.300 V9.4.0 (Jun. 2010); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9); pp. 1-170.

The extended European search report issued by the European Patent Office dated May 8, 2015, which corresponds to European Patent Application No. 12824351.6-1854 and is related to U.S. Appl. No. 14/238,456.

Communication pursuant to Rules 70(2) and 70a(2) EPC issued by the European Patent Office dated May 27, 2015, which corresponds to European Patent Application No. 12824351.6-1854 and is related to U.S. Appl. No. 14/238,456.

NEC; "Disc about Service continuity"; 3GPP TSG-RAN2 Meeting #74; R2-112803; May 9-13, 2011; Barcelona, Spain.

Kyocera; "MBMS service continuity for inbound mobility to non-MBMS capable cells"; 3GPP TSG-RAN WG2 #75; R2-114095; Aug. 22-26, 2011; Athens, Greece.

3GPP TS 36.300 V10.4.0 (Jun. 2011); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10); pp. 1-194.

3GPP TS 23.246 V1 0.1.0 (Jun. 2011); 3rd Generation Partnership Project; Technical Specification Group Services and System Aspects; Multimedia Broadcast/Multicast Service(MBMS); Architecture and functional description(Release 10); pp. 1-65.

LG Electronics Inc.; 3GPP TSG-RAN WG2 #74; "Handover for MBMS service continuity"; Barcelona, Spain; May 9-13, 2011; R2-113338; pp. 1-3.

* cited by examiner

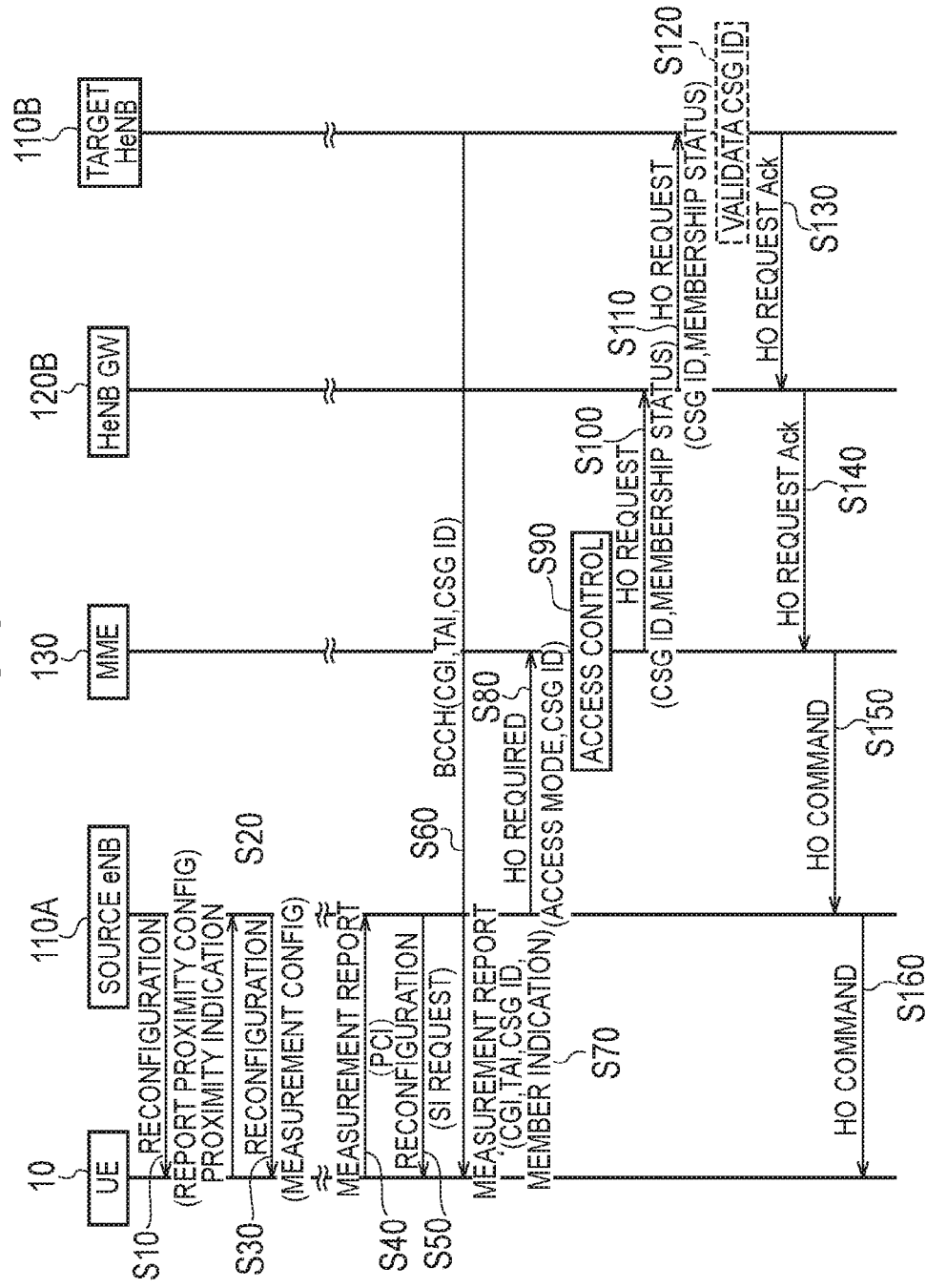

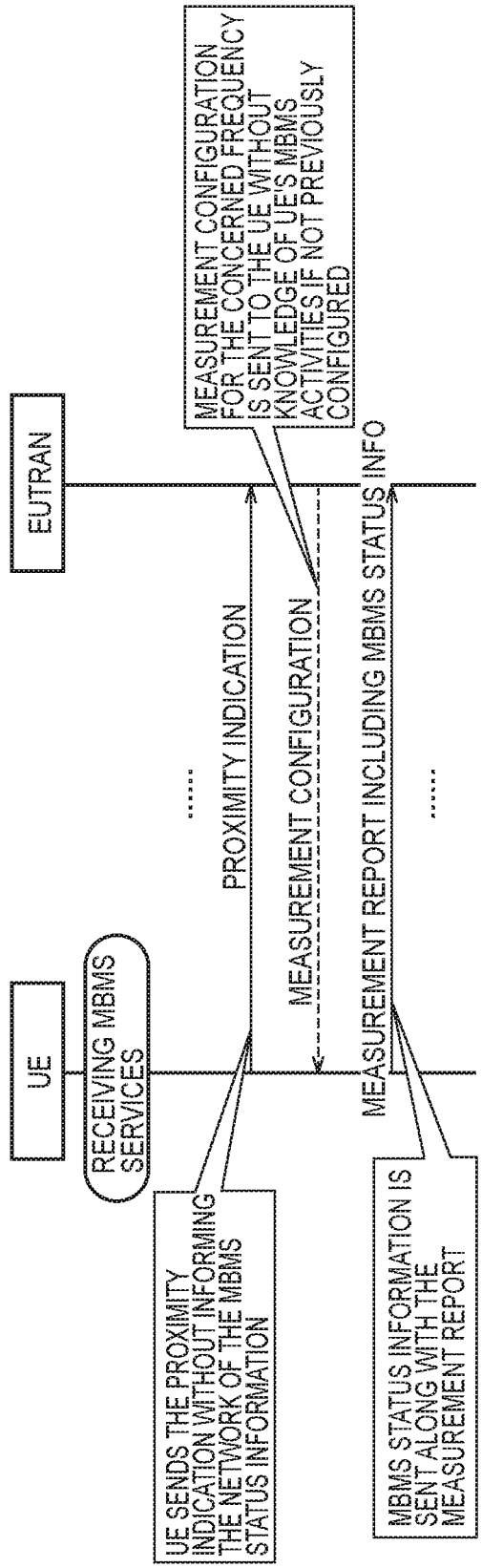

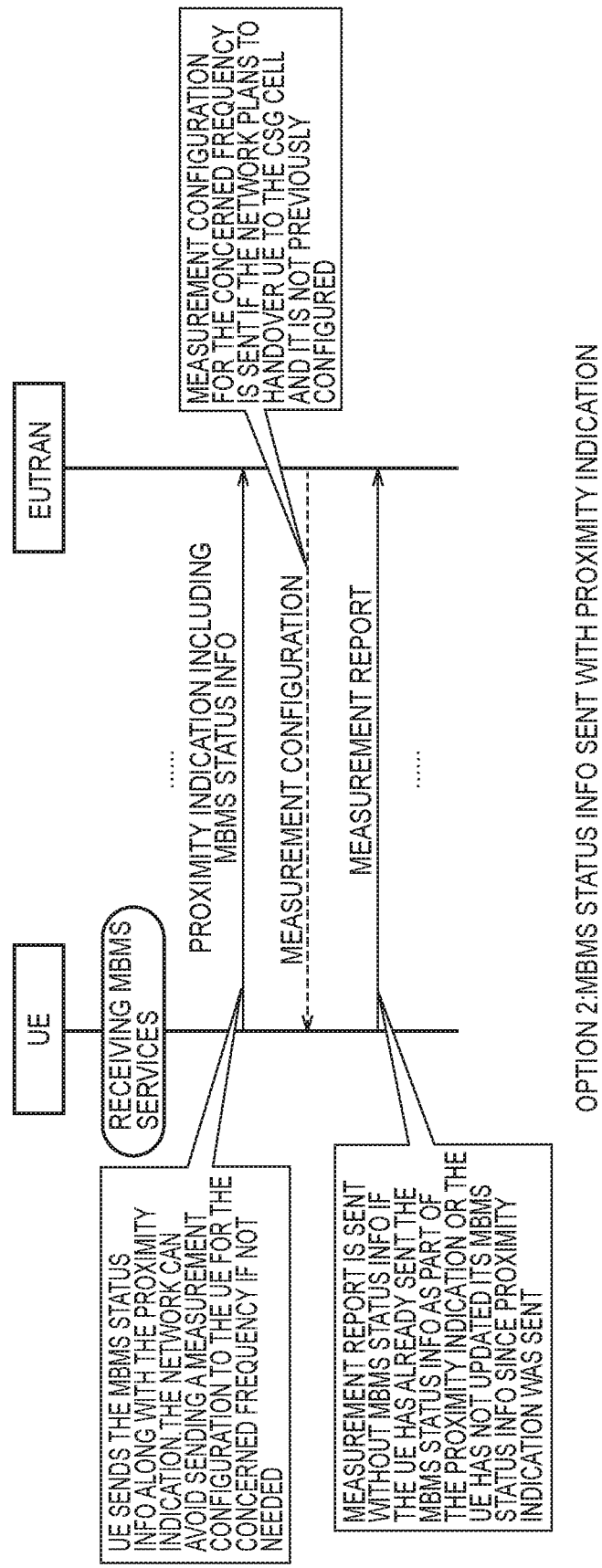

MOBILE COMMUNICATION METHOD, MOBILE TERMINAL, RADIO BASE STATION, AND PROGRAM

This application claims the benefit of priority from U.S. Provisional Application No. 61/523,140 (filed on Aug. 12, 2011) and U.S. Provisional Application No. 61/645,983 (filed on May 11, 2012), the entire contents of which are incorporated herein by reference.

TECHNICAL FIELD

The present disclosure relates to a mobile communication method, a mobile terminal, a radio base station, and a program applicable in a mobile communication system including a general cell supporting a broadcasting of the MBMS data and a specific cell not supporting the broadcasting of the MBMS data.

BACKGROUND ART

Conventionally, a general cell (for example, macro cell) supporting the broadcasting of the MBMS data is known. Furthermore, specific cells referred to as a CSG (Closed Subscriber Group) cell, a home cell, a femto cell, or the like are also known.

Note that an access type can be set for a specific cell. The access type includes "Closed", "Hybrid", or "Open".

The specific cell does not support the broadcasting of the MBMS data. On the other hand, if the mobile terminal is in a connected state, the specific cell can transmit the MBMS data in a unicast manner.

However, if the MBMS data is transmitted in a unicast manner, the merits of broadcasting are not obtained, and the network efficiency declines.

CITATION LIST

Patent Literature

Patent literature 1 3GPP TS 36.300 V9.4.0

SUMMARY

A mobile communication method according to a first feature is a method for distributing MBMS data to a mobile terminal in a mobile communication system including a general cell supporting a broadcasting of the MBMS data and a specific cell not supporting the broadcasting of the MBMS data. The mobile communication method comprises: a step A of determining whether or not to continue a reception of the MBMS data in the general cell, based on at least one of an operation state of the specific cell and a state of service with which the mobile terminal is provided by the general cell, when the mobile terminal receives, in a connected state, the MBMS data broadcasted from the general cell.

A mobile terminal according to a second feature receives MBMS data in a mobile communication system including a general cell supporting a broadcasting of the MBMS data and a specific cell not supporting the broadcasting of the MBMS data. The mobile terminal comprises: a control unit that determines whether or not to continue a reception of the MBMS data in the general cell, based on at least one of an operation state of the specific cell and a state of service with which the mobile terminal is provided by the general cell, when the mobile terminal receives, in a connected state, the MBMS data broadcasted from the general cell.

A radio base station according to a third feature manages a general cell which broadcasts MBMS data in a mobile communication system including a general cell supporting a broadcasting of the MBMS data and a specific cell not supporting the broadcasting of the MBMS data. The radio base station comprises: a control unit that determines whether or not to continue a reception of the MBMS data in the general cell, based on at least one of an operation state of the specific cell and a state of service with which the mobile terminal is provided by the general cell, when the mobile terminal receives, in a connected state, the MBMS data broadcasted from the general cell.

A program according to a fourth feature is used in a mobile terminal that receives MBMS data in a mobile communication system including a general cell supporting a broadcasting of the MBMS data and a specific cell not supporting the broadcasting of the MBMS data. The program causes a computer to execute a step of determining whether or not to continue a reception of the MBMS data in the general cell, based on at least one of an operation state of the specific cell and a state of service with which the mobile terminal is provided by the general cell, when the mobile terminal receives, in a connected state, the MBMS data broadcasted from the general cell.

BRIEF DESCRIPTION OF THE DRAWINGS

FIG. 8 is a sequence diagram illustrating a mobile communication method according to the first embodiment.

FIG. 9 is a diagram explaining remarks.

FIG. 10 is a diagram explaining the remarks.

DESCRIPTION OF THE EMBODIMENTS

Figure 1:
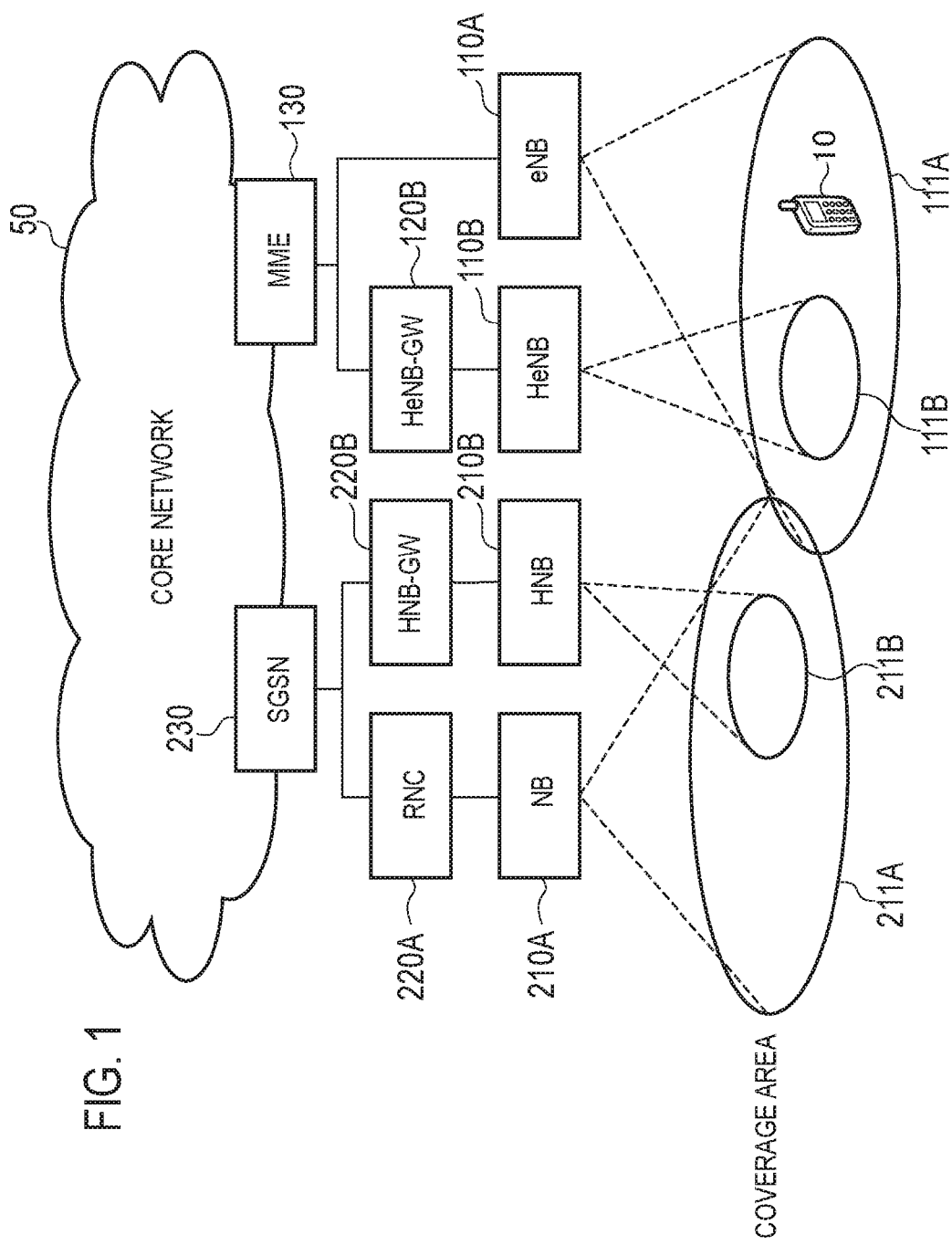
FIG. 1 is a diagram illustrating a mobile communication system 100 according to a first embodiment.

Hereinafter, a description will be given of the mobile communication system according to the embodiments of the present disclosure, with reference to the drawings. Note that the same or similar reference signs are applied to the same or similar portions in the drawings.

It will be appreciated that the drawings are schematically shown and the ratio and the like of each dimension are different from the real ones. Accordingly, specific dimensions should be determined in consideration of the explanation below. Of course, among the drawings, the dimensional relationship and the ratio may be different.

[Summary of the Embodiment]

A mobile communication method according to the embodiment is a method for distributing MBMS data to a mobile terminal in a mobile communication system including a general cell supporting a broadcasting of the MBMS data and a specific cell not supporting the broadcasting of the MBMS data. A step A is comprised, the step A determining whether or not to continue a reception of the MBMS data in the general cell, based on at least one of an operation state of the specific cell and a state of service with which the mobile terminal is provided by the general cell, when the mobile terminal receives, in a connected state, the MBMS data broadcasted from the general cell.

In the embodiment, it is determined whether or not to continue a reception of the MBMS data in a general cell, based on at least one of an operation state of the specific cell and a state of a service with which the mobile terminal is provided by the general cell. Therefore, continuous reception of the MBMS data while suppressing a decline in network efficiency can be achieved.

In the embodiment, the specific cell is preferred to be a cell that is deployed as a small-size cell and a large-size cell. The specific cell is preferred to be a cell that is managed by HNB (Home Node B), HeNB (Home Evolved Node B), a femto BTS, and the like. That is, radio base stations managing the specific cell are the HNB, the HeNB, the femto BTS, and the like.

[First Embodiment]

(Mobile Communication System)

Hereinafter, a mobile communication system according to a first embodiment will be described. FIG. 1 is a diagram illustrating a mobile communication system 100 according to a first embodiment.

As illustrated in FIG. 1, the mobile communication system 100 includes a radio terminal 10 (hereinafter, referred to as UE 10) and a core network 50. Furthermore, the mobile communication system. 100 includes a first communication system and a second communication system.

The first communication system, for example, is a communication system corresponding to LTE (Long Term Evolution). The first communication system, for example, includes a base station 110A (hereinafter, eNB 110A), a home base station 110B (hereinafter, HeNB 110B), a home base station gateway 120B (hereinafter, HeNB-GW 120B), and an MME 130.

A radio access network (E-UTRAN; Evolved Universal Terrestrial Radio Access Network) corresponding to the first communication system is configured from the eNB 110A, the HeNB 110B, and the HeNB-GW 120B.

The second communication system, for example, is a communication system corresponding to UMTS (Universal Mobile Telecommunication System). The second communication system includes abase station 210A (hereinafter, NB 210A), a home base station 210B (hereinafter, HNB 210B), an RNC 220A, a home base station gateway 220B (hereinafter, HNB-GW 220B), and an SGSN 230.

A radio access network (UTRAN; Universal Terrestrial Radio Access Network) corresponding to the second communication system is configured from the NB 210A, the HNB 210B, the RNC 220A, and the HNB-GW 220B.

The UE 10 is a device (User Equipment) configured to communicate with the second communication system or the first communication system. For example, the UE 10 has a function of performing radio communication with the eNB 110A and the HeNB 110B. Alternatively, the UE 10 has a function of performing radio communication with the NB 210A and the HNB 210B.

The eNB 110A, managing a general cell 111A, is a device (evolved NodeB) that performs radio communication with the UE 10 being present in the general cell 111A.

The HeNB 110B, managing a specific cell 111B, is a device (Home evolved NodeB) that performs radio communication with the UE 10 being present in the specific cell 111B.

The HeNB-GW 120B, connected to the HeNB 110B, is a device (Home evolved NodeB Gateway) that manages the HeNB 110B.

The MME 130, connected to the eNB 110A, is a device (Mobility Management Entity) that manages the mobility of the UE 10 having set up a radio connection with the HeNB 110B. Furthermore, the MME 130, connected to the HeNB 110B via the HeNB-GW 120B, is a device that manages the mobility of the UE 10 having set up a radio connection with the HeNB 110B.

The NB 210A, managing a general cell 211A, is a device (NodeB) that performs radio communication with the UE 10 being present in the general cell 211A.

The HNB 210B, managing a specific cell 211B, is a device (Home NodeB) that performs radio communication with the UE 10 being present in the specific cell 211B.

The RNC 220A, connected to the NB 210A, is a device (Radio Network Controller) that sets up a radio connection (RRC Connection) with the UE 10 being present in the general cell 211A.

The HNB-GW 220B, connected to the HNB 210B, is a device (Home NodeB Gateway) that sets up a radio connection (RRC Connection) with the UE 10 being present in the specific cell 211B.

The SGSN 230 is a device (Serving GPRS Support Node) that performs packet switching in a packet switching domain. The SGSN 230 is provided in the core network 50. Although not illustrated in FIG. 1, a device (MSC; Mobile Switching Center) that performs circuit switching in a circuit switching domain may be provided in the core network 50.

Furthermore, the general cell and the specific cell must be understood as functions of performing radio communication with the UE 10. However, the general cell and the specific cell are also used as terms indicating coverage areas of cells. Also, cells such as the general cell and the specific cell are identified based on the frequency used in the cell, the spreading code, the time slot, or the like.

The specific cell is also referred to as a femto cell, a CSG (Closed Subscriber Group) cell, a home cell, and the like. The specific cell is configured to enable the setup of an access type for defining the UE 10 that can access the specific cell. The access type is "Closed", "Hybrid", or "Open".

A "Closed" specific cell is configured to allow only the provision of service to the UE 10 (UE; User Equipment) managed by the specific cell.

A "Hybrid" specific cell, for example, is configured to allow high-quality communications for the UE 10 managed by the specific cell, and is also configured to allow communications of best-effort quality for the UE 10 not managed by the specific cell.

An "Open" specific cell is configured to allow the provision of service to all the UE 10s, in the same way as the general cell. In an "Open" cell, the difference in the quality of communications between the UE 10s is not differentiated depending on whether or not the UE 10 is managed by the specific cell.

The access type can also be "ACCESS CLASS BARRED" in which the UE 10 access is prohibited for each access class, or "CELL BARRED" in which the UE 10 access is prohibited for each cell.

Hereinafter, the first communication system will be mainly described. The following description may also be applied to the second communication system.

Here, in the first communication system, an OFDMA (Orthogonal Frequency Division Multiple Access) scheme is used as a downlink multiplexing scheme, and an SC-FDMA (Single-Carrier Frequency Division Multiple Access) scheme is used as an uplink multiplexing scheme.

Furthermore, in the first communication system, an uplink channel includes an uplink control channel (PUCCH; Physical Uplink Control Channel), an uplink shared channel (PUSCH; Physical Uplink Shared Channel), and the like. Furthermore, a downlink channel includes a downlink control channel (PDCCH; Physical Downlink Control Channel), a downlink shared channel (PDSCH; Physical Downlink Shared Channel), and the like.

The uplink control channel is a channel used to transfer a control signal. The control signal, for example, includes CQI (Channel Quality Indicator), PMI (Precoding Matrix Indicator), RI (Rank Indicator), SR (Scheduling Request), and ACK/NACK.

The CQI is a signal for notifying a recommended modulation method and a coding rate to be used in downlink transmission. The PMI is a signal indicating a precoder matrix which is preferably used in downlink transmission. The RI is a signal indicating the number of layers (the number of streams) to be used in downlink transmission. The SR is a signal for requesting the assignment of an uplink radio resource (a resource block which will be described later). The ACK/NACK is a signal indicating whether a signal transmitted via the downlink channel (for example, the PDSCH) has been successfully received.

The uplink shared channel is a channel used to transfer a control signal (includes the above-mentioned control signal) and/or a data signal. For example, the uplink radio resource may be assigned only to the data signal, or assigned such that the data signal and the control signal are multiplexed.

The downlink control channel is a channel used to transfer a control signal. The control signal, for example, includes Uplink SI (Scheduling Information), Downlink SI (Scheduling Information), and a TPC bit.

The Uplink SI is a signal indicating the assignment of the uplink radio resource. The Downlink SI is a signal indicating the assignment of a downlink radio resource. The TPC bit is a signal for instructing increase or decrease in the power of a signal transmitted via the uplink channel.

The downlink shared channel is a channel used to transfer a control signal and/or a data signal. For example, the downlink radio resource may be assigned only to the data signal, or assigned such that the data signal and the control signal are multiplexed.

In addition, a control signal transmitted via the downlink shared channel includes TA (Timing Advance). The TA is transmission timing correction information between the UE 10 and the eNB 110A, and is measured by the eNB 110A based on an uplink signal transmitted from the UE 10.

Furthermore, a control signal transmitted via a channel, other than the downlink control channel (the PDCCH) and the downlink shared channel (the PDSCH), includes ACK/NACK. The ACK/NACK is a signal indicating whether a signal transmitted via the uplink channel (for example, the PUSCH) has been successfully received.

In the first embodiment, the general cell is a cell supporting broadcasting of the MBMS data. The general cell broadcasts the MBMS service information indicating the content (program schedule) of the MBMS data. Alternatively, the general cell broadcasts the MBMS service change information indicating that the MBMS service information is changed, and also indicating the timing of change of the MBMS service information. For example, the general cell transmits the MBMS data via MTCH (Multicast Traffic Channel). Furthermore, the general cell transmits the MBMS service information indicating the content (program schedule) of the MBMS data, via MCCH (Multicast Traffic Channel). Alternatively, the general cell transmits the MBMS service information via the MTCH. Alternatively, the general cell broadcasts the MBMS service information as SIB via a broadcast channel.

In contrast to this, the specific cell is a cell that does not support the broadcasting of the MBMS data. Therefore, it must be noted that the specific cell does not have the function of broadcasting the MBMS data, and generally, the specific cell does not broadcast the MBMS service information or the MBMS service change information. However, the specific cell can transmit the MBMS data to a UE 10 in the connected state that is connected to the specific cell. For example, the specific cell can transmit the MBMS data by using PDSCH.

The general cell and the specific cell broadcast broadcast information via a broadcast channel (BCCH; Broadcast Control Channel). The broadcast information, for example, is information such as MIB (Master Information Block) or SIB (System Information Block).

(Radio Frame)

Figure 2:
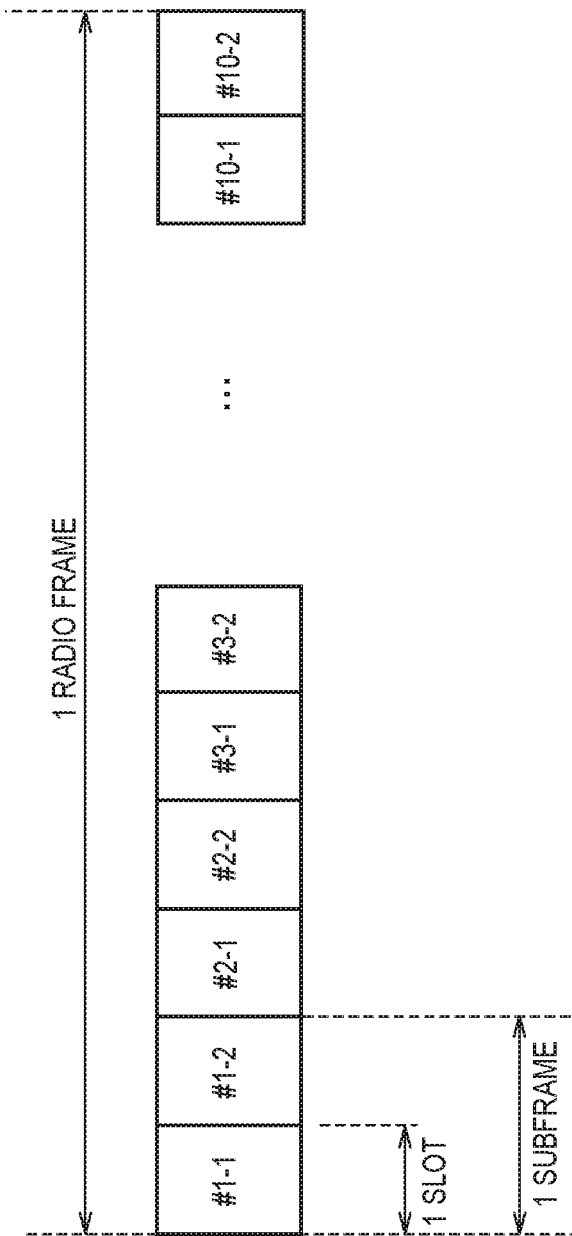
FIG. 2 is a diagram illustrating a radio frame according to the first embodiment.

Hereinafter, a radio frame in the first communication system will be described. FIG. 2 is a diagram illustrating the radio frame in the first communication system.

As illustrated in FIG. 2, one radio frame is configured by 10 subframes and one subframe is configured by two slots. One slot has a time length of 0.5 msec, one subframe has a time length of 1 msec, and one radio frame has a time length of 10 msec.

In addition, one slot is configured by a plurality of OFDM symbols (for example, six OFDM symbols or seven OFDM symbols) in the downward direction. In the same manner, one slot is configured by a plurality of SC-FDMA symbols (for example, six SC-FDMA symbols or seven SC-FDMA symbols) in the upward direction.

(Radio Resource)

Figure 3:
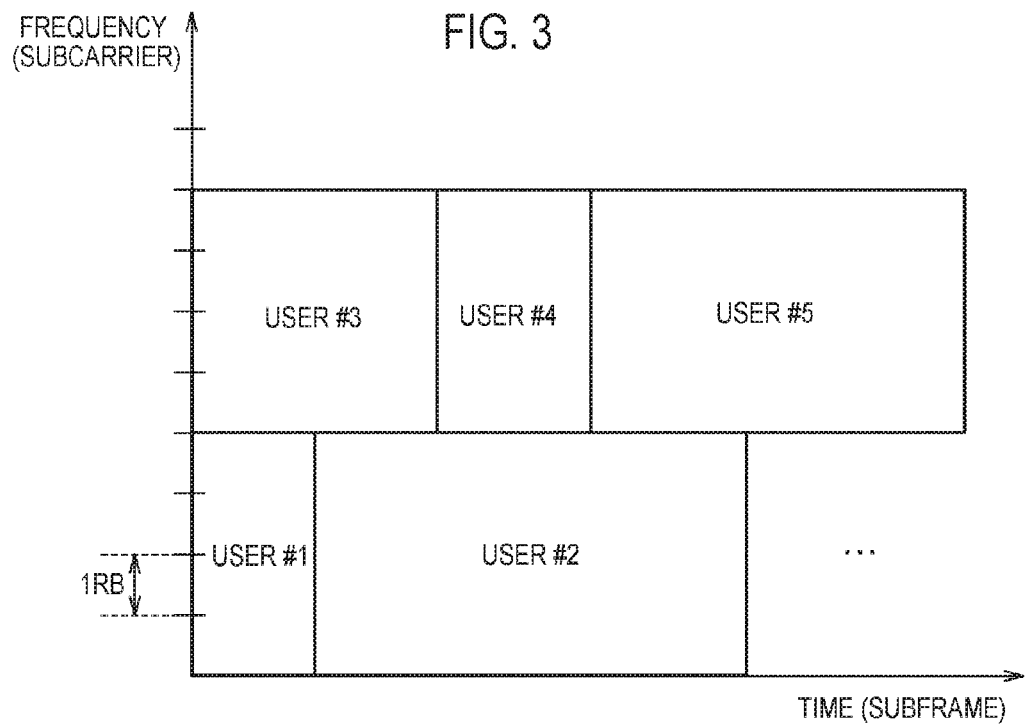
FIG. 3 is a diagram illustrating a radio resource according to the first embodiment.

Hereinafter, a radio resource in the first communication system will be described. FIG. 3 is a diagram illustrating the radio resource in the first communication system.

As illustrated in FIG. 3, a radio resource is defined by a frequency axis and a time axis. A frequency is configured by a plurality of subcarriers, and a predetermined number of subcarriers (12 subcarriers) are collectively called a resource block (RB). A time has a unit, such as the OFDM symbol (or the SC-FDMA symbol), the slot, the subframe, or the radio frame, as described above.

Here, the radio resource is assignable to each one resource block. Furthermore, on the frequency axis and the time axis, it is possible to divide the radio resources to assign the same to a plurality of users (for example, user #1 to user #5).

Furthermore, the radio resource is assigned by the eNB 110A. The eNB 110A assigns the radio resource to each UE 10 based on the CQI, the PMI, the RI, and the like.

(Mobile Terminal)

Figure 4:
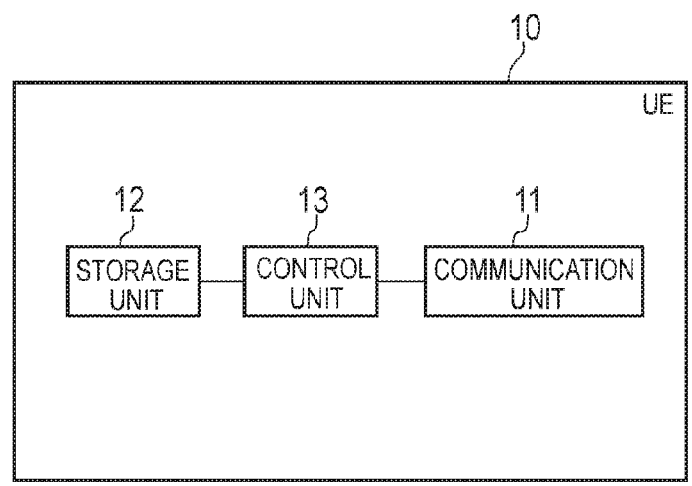
FIG. 4 is a block diagram illustrating a UE 10 according to the first embodiment.

Hereinafter, the mobile terminal according to the first embodiment will be described. FIG. 4 is a block diagram illustrating a UE 10 according to the first embodiment.

Hereinafter, a case in which the reception of MBMS data is canceled in the general cell when the UE 10 receives the MBMS data broadcasted from the general cell, in a connected state, will be mainly described. In the first embodiment, the reception of MBMS data is canceled in the general cell and a handover is performed from the general cell to the specific cell. However, the handover from the general cell to the specific cell may be omitted.

It must be noted that the UE 10 receiving the MBMS data includes not only the UE 10 that actually receives the MBMS data, but also the UE 10 attempting to receive the MBMS data. The UE 10 attempting to receive the MBMS data, for example, is a UE 10 that notifies the network of its interest in the content of the MBMS data.

As illustrated in FIG. 4, the UE 10 includes a communication unit 11, a storage unit 12, and a control unit 13.

The communication unit 11 performs radio communication with the radio base station (eNB 110A or NB 210A) managing the general cell. Furthermore, the communication unit 11 performs radio communication with the radio base station (HeNB 110B or HNB 210B) managing the specific cell.

The storage unit 12 stores different types of information for controlling the UE 10. For example, the storage unit 12 stores a program for operating the UE 10. Furthermore, the storage unit 12 stores a list of specific cells to which the UE 10 can connect, that is, a list of specific cells that are allowed to provide service to the UE 10 (CSG white list).

The control unit 13 controls the operation of the UE 10. For example, the control unit 13 controls the handover of the UE 10.

Generally, a handover is determined by a source cell, however, in the first embodiment, a handover from the general cell to the specific cell is mainly described.

Specifically, the control unit 13 determines whether or not to perform a handover from the general cell to the specific cell, based on at least one of an operation state of the specific cell and a state of service with which the UE 10 is provided by the general cell.

When the control unit 13 determines to cancel the reception of MBMS data in the general cell, i.e., when the control unit 13 determines to perform a handover from the general cell to the specific cell, the control unit 13 transmits the information indicating a presence of a specific cell to which the UE 10 can connect (Proximity Indication), to the general cell. The reception of MBMS data in the general cell is canceled, and a handover from the general cell to the specific cell is thus performed.

For example, in the "autonomous search procedure", when a specific cell to which the UE 10 can connect is identified, the UE 10 transmits a "Proximity Indication" to the general cell. Based on the "Proximity Indication", the general cell determines whether or not to have the UE 10 perform a handover from the general cell to the specific cell.

In contrast to this, in the first embodiment, when the control unit 13 determines to continue the reception of MBMS data in the general cell, i.e., when the control unit 13 determines not to perform a handover from the general cell to the specific cell, the control unit 13 does not transmit the information indicating a presence of a specific cell to which the UE 10 can connect (Proximity Indication), to the general cell, and suspends the transmission of the information (Proximity Indication). A handover from the general cell to the specific cell can thus be suspended under the initiative of the UE 10.

For example, in the "autonomous search procedure", even when a specific cell to which the UE 10 can connect is identified, the UE 10 does not transmit a "Proximity Indication" to the general cell, and suspends the transmission of the "Proximity Indication".

The operation state of the specific cell includes at least one of a load of the specific cell and an installation status of the specific cell. The load of the specific cell includes the amount of downlink data, the amount of uplink data, and the amount of downlink and uplink data. The installation status of the specific cell includes the coverage area of the specific cell, coverage areas of general cells positioned in neighborhood of the specific cell, and the like.

Figure 5:
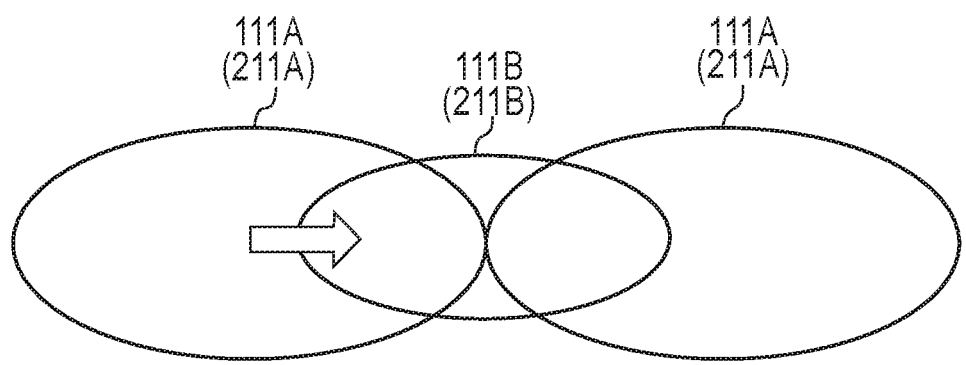
FIG. 5 is a diagram for explaining an installation environment according to the first embodiment.
Figure 6:
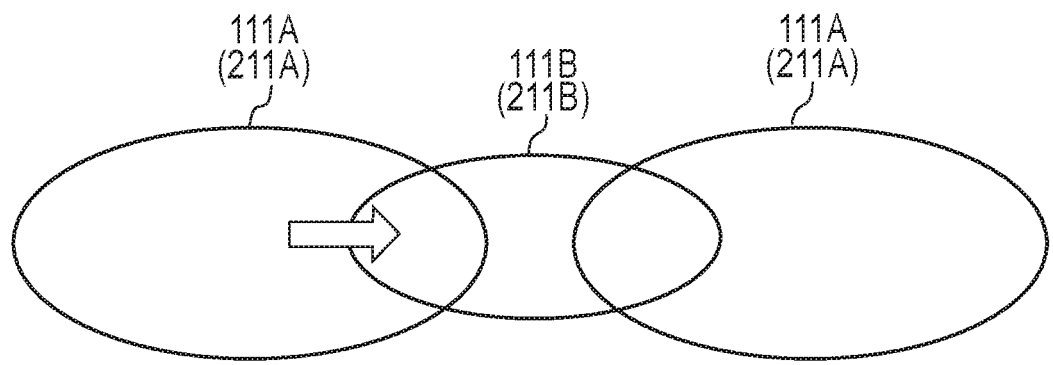
FIG. 6 is a diagram for explaining the installation environment according to the first embodiment.

For example, as illustrated in FIG. 5, when general cells having coverage areas neighboring a coverage area of the specific cell exist, the control unit 13 may determine to continue the reception of MBMS data in the general cell, without performing a handover from the general cell to the specific cell. On the other hand, as illustrated in FIG. 6, when general cells having coverage areas neighboring a coverage area of the specific cell do not exist, the control unit 13 may cancel the reception of MBMS data in the general cell and determine to perform a handover from the general cell to the specific cell.

When the load of the specific cell is larger than a predetermined load, the control unit 13 may determine to continue the reception of MBMS data in the general cell, without performing a handover from the general cell to the specific cell. In other words, when the load of the specific cell is smaller than the predetermined load, the control unit 13 may determine to cancel the reception of MBMS data in the general cell and perform a handover from the general cell to the specific cell.

The state of service includes at least one of the amount of the MBMS data, the amount of the user data other than the MBMS data, and the suspension of the broadcasting of the MBMS data.

For example, when the suspension of the broadcasting of the MBMS data is decided, the control unit 13 may determine to cancel the reception of MBMS data in the general cell and perform a handover from the general cell to the specific cell. In other words, when the broadcasting of the MBMS data is continuing, the control unit 13 may determine to continue the reception of MBMS data in the general cell, without performing a handover from the general cell to the specific cell.

When the amount of the user data other than the MBMS data is larger than a predetermined threshold, the control unit 13 may determine to cancel the reception of MBMS data in the general cell and perform a handover from the general cell to the specific cell. In other words, when the amount of the user data other than the MBMS data is smaller than the predetermined threshold, the control unit 13 may determine to continue the reception of MBMS data in the general cell, without performing a handover from the general cell to the specific cell.

When the amount of the MBMS data is larger than a predetermined threshold, the control unit 13 may determine to continue the reception of MBMS data in the general cell, without performing a handover from the general cell to the specific cell. In other words, when the amount of the MBMS data is smaller than the predetermined threshold, the control unit 13 may determine to cancel the reception of MBMS data in the general cell and perform a handover from the general cell to the specific cell.

(Radio Base Station)

Figure 7:
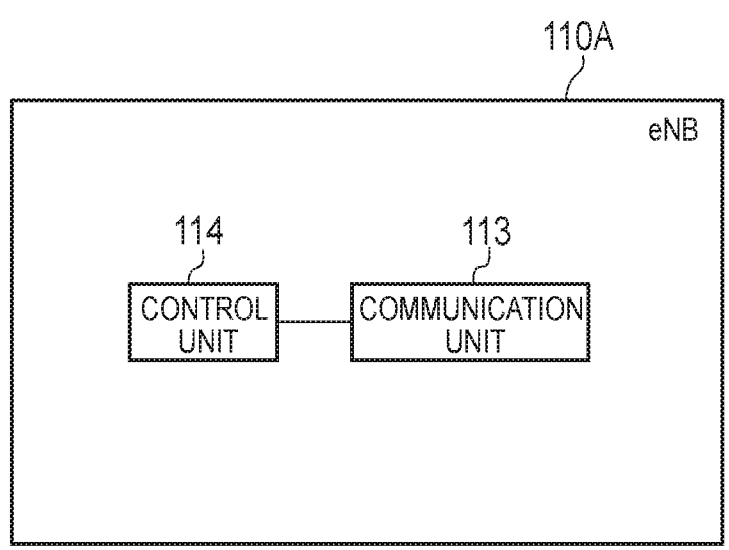
FIG. 7 is a block diagram illustrating an eNB 110A according to the first embodiment.

Hereinafter, the radio base station according to the first embodiment will be described. FIG. 7 is a block diagram illustrating an eNB 110A according to the first embodiment. Note that the radio base station may be NB 210A.

Hereinafter, a case in which a handover is performed from the general cell to the specific cell when the UE 10 receives the MBMS data broadcasted from the general cell, in a connected state, will be mainly described.

It must be noted that the UE 10 receiving the MBMS data is not only the UE 10 that actually receives the MBMS data, but also the UE 10 attempting to receive the MBMS data. The UE 10 attempting to receive the MBMS data, for example, is a UE 10 that notifies the network of its interest in the content of the MBMS data.

As illustrated in FIG. 7, the eNB 110A includes a communication unit 113 and a control unit 114.

The communication unit 113 performs radio communication with the UE 10 being present in the general cell. Furthermore, the communication unit 113 performs radio communication with the UE 10 being present in the specific cell.

The control unit 114 controls the operation of the eNB 110A. For example, the control unit 114 controls the handover of the UE 10.

Generally, the control unit 114 controls the handover of the UE 10 based on a measurement report received from the UE 10, however, in the first embodiment, a handover from the general cell to the specific cell is mainly described.

Specifically, the control unit 114 determines whether or not to continue the reception of MBMS data in the general cell, based on at least one of an operation state of the specific cell and a state of service with which the UE 10 is provided by the general cell. In the first embodiment, the control unit 114 may determine whether or not to perform a handover from the general cell to the specific cell.

When the control unit 114 determines to cancel the reception of MBMS data in the general cell and perform a handover from the general cell to the specific cell, the control unit 114 receives the information (Proximity Indication) indicating a presence of a specific cell to which the UE 10 can connect, from the UE 10. A handover from the general cell to the specific cell is thus performed.

In contrast to this, in the first embodiment, when the control unit 114 determines to continue the reception of MBMS data in the general cell and not to perform a handover from the general cell to the specific cell, then even if the control unit 114 receives the information (Proximity Indication) indicating a presence of a specific cell to which the UE 10 can connect, from the UE 10, the control unit 114 omits the process (such as handover process) corresponding to such information (Proximity Indication). A handover from the general cell to the specific cell is thus suspended.

As described above, the operation state of the specific cell includes at least one of the load of the specific cell and the installation status of the specific cell. The load of the specific cell includes the amount of downlink data, the amount of uplink data, and the amount of downlink and uplink data. The installation status of the specific cell includes the coverage area of the specific cell, coverage areas of general cells positioned in neighborhood of the specific cell, and the like.

For example, as described above, when general cells having coverage areas neighboring a coverage area of the specific cell exist, the control unit 114 may determine to continue the reception of MBMS data in the general cell, without performing a handover from the general cell to the specific cell (see FIG. 5). On the other hand, as described above, when general cells having coverage areas neighboring a coverage area of the specific cell do not exist, the control unit 114 may determine to cancel the reception of MBMS data in the general cell and perform a handover from the general cell to the specific cell (see FIG. 6).

When the load of the specific cell is larger than a predetermined load, the control unit 114 may determine to continue the reception of MBMS data in the general cell, without performing a handover from the general cell to the specific cell. In other words, when the load of the specific cell is smaller than the predetermined load, the control unit 114 may determine to cancel the reception of MBMS data in the general cell and perform a handover from the general cell to the specific cell.

As described above, the state of service includes at least one of the amount of the MBMS data, the amount of the user data other than the MBMS data, and the suspension of the broadcasting of the MBMS data.

For example, when the suspension of the broadcasting of the MBMS data is decided, the control unit 114 may determine to cancel the reception of MBMS data in the general cell and perform a handover from the general cell to the specific cell. In other words, when the broadcasting of the MBMS data is continuing, the control unit 114 may determine to continue the reception of MBMS data in the general cell, without performing a handover from the general cell to the specific cell.

When the amount of the user data other than the MBMS data is larger than a predetermined threshold, the control unit 114 may determine to cancel the reception of MBMS data in the general cell and perform a handover from the general cell to the specific cell. In other words, when the amount of the user data other than the MBMS data is smaller than the predetermined threshold, the control unit 114 may determine to continue the reception of MBMS data in the general cell, without performing a handover from the general cell to the specific cell.

When the amount of the MBMS data is larger than a predetermined threshold, the control unit 114 may determine to continue the reception of MBMS data in the general cell, without performing a handover from the general cell to the specific cell. In other words, when the amount of the MBMS data is smaller than the predetermined threshold, the control unit 114 may determine to cancel the reception of MBMS data in the general cell and perform a handover from the general cell to the specific cell.

(Mobile Communication Method)

Hereinafter, the mobile communication method according to the first embodiment will be described. FIG. 8 is a sequence diagram illustrating a mobile communication method according to the first embodiment.

Hereinafter, a case in which the reception of MBMS data is canceled in the general cell when the UE 10 receives the MBMS data broadcasted from the general cell, in a connected state, will be mainly described. In the first embodiment, the reception of MBMS data is canceled in the general cell and a handover is performed from the general cell to the specific cell.

As illustrated in FIG. 8, in step 10, the eNB 110A managing the general cell transmits information (Reconfiguration) requesting to report whether or not a specific cell to which the UE 10 can connect is present, to the UE 10.

In step 20, the UE 10 transmits the information (Proximity Indication) indicating a presence of a specific cell to which the UE 10 can connect, to the eNB 110A managing the general cell.

As described above, it must be noted that when the UE 10 determines to continue the reception of MBMS data in the general cell without performing a handover from the general cell to the specific cell, the UE 10 does not transmit such information (Proximity Indication). Therefore, in such cases, the connection to the general cell is maintained without performing a handover from the general cell to the specific cell, after a series of sequences is complete.

In step 30, the eNB 110A managing the general cell transmits information (Reconfiguration) instructing the measurement of the quality of the specific cell reported in the information (Proximity Indication), to the UE 10. Such information (Reconfiguration) includes a measurement gap for measuring the quality of the specific cell.

As described above, it must be noted that when the eNB 110A determines to continue the reception of MBMS data in the general cell without performing a handover from the general cell to the specific cell, the UE 10 omits the process corresponding to such information (Proximity Indication). Therefore, in such cases, the connection to the general cell is maintained without performing a handover from the general cell to the specific cell, after a series of sequences is complete.

In step 40, the UE 10 transmits a quality report of the specific cell to the eNB 110A managing the general cell. The quality report includes a physical identifier (PCI; Physical Cell Identifier) for identifying the specific cell.

In step 50, the eNB 110A managing the general cell transmits information (SI request) maintaining the acquisition of the broadcast information (SI; System Information), to the UE 10.

In step 60, the UE 10 receives the broadcast information (SI) broadcasted from the HeNB 110B managing the specific cell. The broadcast information (SI) includes CGI (Cell Global Identity), TAI (Tracking Area Identity), CSG ID, and the like.

In step 70, the UE 10 transmits the broadcast information acquired in the step 60, and information indicating whether or not a connection can be established to the specific cell (Member Indication), to the eNB 110A managing the general cell.

In step 80, the eNB 110A managing the general cell transmits information (HO Required) requesting a handover from the general cell to the specific cell, to the MME 130.

In step 90, the MME 130 determines whether or not to allow the connection of the UE 10 to the specific cell. Now, the description will be continued by assuming that the connection of the UE 10 to the specific cell is allowed.

In step 100 and step 110, the MME 130 transmits information (HO Request) requesting a handover from the general cell to the specific cell, to the HeNB 110B managing the specific cell, via the HeNB-GW 120B.

In step 120, the HeNB 110B managing the specific cell allocates a radio resource to the UE 10.

In step 130 and step 140, the HeNB 110B managing the specific cell transmits a response (HO Request Ack) against information (Handover Request) received from the MME 130, to the MME 130, via the HeNB-GW 120B.

In step 150 and step 160, the MME 130 transmits information instructing a handover from the general cell to the specific cell (HO command), to the UE 10, via the eNB 110A managing the general cell.

(Operation and Effect)

In the first embodiment, it is determined whether or not to continue the reception of MBMS data in the general cell, based on at least one of an operation state of the specific cell and a state of service with which the UE 10 is provided by the general cell. Therefore, continuous reception of the MBMS data while suppressing a decline in network efficiency can be achieved.

Speaking in detail, by determining whether or not to continue the reception of MBMS data in the general cell by using the operation state of the specific cell, the below effect is obtained.

For example, as seen in the case illustrated in FIG. 5, when general cells having coverage areas neighboring a coverage area of the specific cell exist, it is determined to continue the reception of MBMS data in the general cell, without performing a handover from the general cell to the specific cell. This achieves a continuous reception of the MBMS data. On the other hand, as seen in the case illustrated in FIG. 6, when general cells having coverage areas neighboring a coverage area of the specific cell do not exist, the specific cell can be used effectively by canceling the reception of MBMS data in the general cell and performing a handover from the general cell to the specific cell. In the case illustrated in FIG. 6, it must be noted that even though the connection to the general cell is maintained, continuous reception of the MBMS data might not be achieved.

When the load of the specific cell is larger than a predetermined load, the reception of MBMS data in the general cell is continued, without performing a handover from the general cell to the specific cell. As a result, congestion of the specific cell does not occur, and continuous reception of the MBMS data is achieved. On the other hand, when the load of the specific cell is smaller than the predetermined load, the reception of MBMS data in the general cell is canceled and a handover from the general cell to the specific cell is performed. As a result, the specific cell is used preferentially and the network efficiency improves. Furthermore, for example, even when the MBMS data is transmitted from the specific cell in a unicast manner, congestion of the specific cell does not occur.

Additionally, by determining whether or not to continue the reception of MBMS data in the general cell by using the state of service, the below effect is obtained.

For example, when the amount of the user data other than the MBMS data is larger than a predetermined threshold, the reception of MBMS data in the general cell is canceled and a handover from the general cell to the specific cell is performed. As regards services other than the MBMS data, by preferentially using the specific cell, the load of the general cell can be reduced, which improves the network efficiency. On the other hand, when the amount of the user data other than the MBMS data is smaller than the predetermined threshold, the reception of MBMS data in the general cell is continued, without performing a handover from the general cell to the specific cell. A continuous reception of the MBMS data is achieved.

When the amount of the MBMS data is larger than a predetermined threshold, the reception of MBMS data in the general cell is continued, without performing a handover from the general cell to the specific cell. Therefore, due to the broadcasting of a large amount of the MBMS data from the general cell, the network efficiency improves. On the other hand, when the amount of the MBMS data is smaller than the predetermined threshold, the reception of MBMS data in the general cell is canceled and a handover from the general cell to the specific cell is performed. As a result, the specific cell is used preferentially and the network efficiency improves. Furthermore, for example, even when the MBMS data is transmitted from the specific cell in a unicast manner, congestion of the specific cell does not occur.

[Other Embodiments]

The present disclosure is explained through the above embodiment, but it must not be understood that this disclosure is limited by the statements and the drawings constituting a part of this disclosure. From this disclosure, various alternative embodiments, examples, and operational technologies will become apparent to those skilled in the art.

Although not particularly mentioned in the embodiment, after the handover from the general cell to the specific cell, the UE 10 may transit to the connected state in the specific cell, and may receive the MBMS data from the specific cell in a unicast manner. For example, the MBMS data is received by using PDSCH. The process of transmitting the MBMS data from the specific cell by unicast or the process of receiving the MBMS data from the specific cell by unicast may be omitted.

Although not particularly mentioned in the embodiment, when the eNB 110A determines not to perform a handover from the general cell to the specific cell, the eNB 110A may suspend the transmission of the information (HO Required) requesting a handover from the general cell to the specific cell. A handover from the general cell to the specific cell is thus suspended.

In the embodiment, a handover procedure (S1 handover procedure) performed via the MME 130 was illustrated as a handover from the general cell to the specific cell. However, the handover procedure from the general cell to the specific cell may also be a handover procedure (X2 handover procedure) that makes use of an interface between base stations.

Although not particularly mentioned in the embodiment, when a target cell of handover is the specific cell, the UE 10 may transmit MBMS status information indicating a status of the MBMS data that the UE 10 is receiving, to the general cell. The MBMS status information, for example, is at least one piece of information among (a) the information indicating whether or not the MBMS data is being received, (b) the MBMS service information indicating the content of the MBMS data that the UE 10 is receiving, and (c) the information indicating the frequency of the MBMS data that the UE 10 is receiving.

The UE 10 may transmit the MBMS status information along with the information (Proximity Indication) transmitted in the step 20. Alternatively, the UE 10 may transmit the MBMS status information along with the measurement report transmitted in the step 40.

The general cell may determine whether or not to perform a handover from the general cell to the specific cell, based on the MBMS status information.

Although not particularly mentioned in the embodiment, a program for causing a computer to execute each step performed by the UE 10 may be provided. Alternatively, a processor for executing each step (the program) performed by the UE 10 may be provided. The program may be stored in computer readable media. The program can be installed in a computer by using the computer readable media. Here, the computer readable media may be non-transitory storage media. The non-transitory storage media may be CD-ROM or DVD-ROM, for example.

Network Based Operation

In order to support continuity of MBMS service, the network would also need to take into account of specific cell loading, the size of MBMS data, coverage conditions and reliability of MBMS service. Therefore, it would be beneficial for the network to receive MBMS status information from the UE prior to making any handover decision for inbound mobility into a non-MBMS capable cell. Therefore, the UE should provide MBMS status information to the network prior to inbound mobility into a non-MBMS capable cell.

In this case, there is also the question of when it is appropriate for the UE to send the MBMS status information to the network and how often. Although the UE may receive different MBMS services while in Connected, it is only the UE's MBMS service status just prior to handover that really matters. More frequent MBMS status updates will only add unnecessary signalling load to the network. Therefore, the UE should only send the MBMS status information to the network just prior to the handover decision process.

CSG cell is a special case of non-MBMS capable cell and currently the network's decision for inbound mobility into a CSG cell is mainly based on measurement reports from the UE and whether the target cell belongs to the UE's Whitelist. The current behaviour for inbound mobility into a CSG cell assumes the member-UE would autonomously decide whether it is near a CSG cell and whether the CSG ID is in the UE's whitelist. Once the member-UE autonomously determines that it is near a CSG cell it will send a Proximity Indication message to the network. And if a measurement configuration is not present for the concerned frequency of the CSG cell the network may decide whether to configure the UE to perform measurements and reporting for the concerned frequency. Therefore, there are two options for when the UE can report the MBMS status information to the network.

Option 1: Only send the MBMS status information to the network when a measurement report is sent.

Option 2: If the UE sends a proximity indication to the network, the UE will also send the MBMS status information.

With option 1, the UE will not send the MBMS status information along with the proximity indication. Therefore, the network's decision for configuring the UE to perform measurement on the concerned frequency will not be based whether the UE has any MBMS related activities. If the MBMS status information is only sent when the UE sends the measurement report, the network may never know that the UE is actively receiving MBMS service prior to the handover decision.

With option 2 the UE would have the option to inform the network when the proximity indication is sent. Therefore, if the network decides not to handover the UE to the CSG cell due to e.g., the lack of available MBMS services or MBMS notification information, the network would not need to configure the UE to perform measurements in the inter-frequency case so it reduces unnecessary signalling and reduces power consumption at the UE. At least the network will be making a handover decision with full knowledge of UE's MBMS activities.

Since option 2 provides the proper information to the network at the proper time, we propose that option 2 be adopted. Therefore, if the UE sends a proximity indication to the network, the UE will also send the MBMS status information.

UE Based Operation

In some cases, it may be desirable for the UE to continue its MBMS service on the MBMS serving cell (e.g., to continue to receive MBMS change notification information not available on the CSG cell). If the signal strength of the MBMS serving cell has not deteriorated and in order to further reduce unnecessary signalling, the UE should also have the option not to send proximity indication to the network. This also implies that the UE will not need to send MBMS status information to the network. Therefore, UE should have the option to autonomously decide whether proximity indication should be send to the network to support continuity of MBMS service.

The need for informing the network of MBMS status information for inbound mobility into a CSG cell is described. In particular, the timing of when the MBMS status information should be sent is discussed for both inter-frequency and intra-frequency handovers. It is FFS how we provide MBMS service continuity for other types of non-MBMS capable cells.

The UE should provide MBMS status information to the network prior to inbound mobility into a non-MBMS capable cell.

The UE should only send the MBMS status information to the network just prior to the handover decision process.

If the UE sends a proximity indication to the network, the UE will also send the MBMS status information.

UE should have the option to autonomously decide whether proximity indication should be send to the network to support continuity of MBMS service.

INDUSTRIAL APPLICABILITY

With the present disclosure, it is possible to achieve the continuous reception of MBMS data while suppressing the degradation of network efficiency.

The invention claimed is:

1. A mobile terminal, comprising:
a memory; and
a processor coupled to the memory, the processor configured to execute processes of:
  receiving control information for MBMS (Multimedia Broadcast Multicast Service), the control information broadcasted from a cell,
  receiving MBMS data broadcasted from the cell,
  determining whether or not to continue a reception of the MBMS data in the cell, based on a state of service with which the mobile terminal is provided by the cell, when the mobile terminal receives, in a connected state, the MBMS data, wherein the state of service includes at least one of an amount of the MBMS data, an amount of the user data other than the MBMS data, and a suspension of the broadcasting of the MBMS data, and
  transmitting, to a radio base station that manages the cell, information based on a result of determining whether or not to continue the reception of the MBMS data in the cell, wherein the information indicates the mobile terminal has an interest in receiving the MBMS data, and wherein the information includes MBMS frequency on which the mobile terminal receives the MBMS data.

2. A radio base station, comprising:
a memory; and
a processor coupled to the memory, the processor configured to execute processes of:
  broadcasting control information for MBMS (Multimedia Broadcast Multicast Service) to a mobile terminal via a cell managed by the base station,
  broadcasting MBMS data to the mobile terminal via the cell,
  receiving, from the mobile terminal, information based on a result of a determination made by the mobile terminal whether or not to continue the reception of the MBMS data by the mobile terminal,
  wherein the determination of whether or not to continue the reception of the MBMS data is based on a state of service with which the mobile terminal is provided by the cell, when the mobile terminal receives, in a connected state, the MBMS data,
  wherein the state of service includes at least one of an amount of the MBMS data, an amount of the user data other than the MBMS data, and a suspension of the broadcasting of the MBMS data,
  wherein the information indicates the mobile terminal has an interest in receiving the MBMS data, and
  wherein the information includes MBMS frequency on which the mobile terminal receives the MBMS data.

3. A device for a mobile terminal, comprising:
a memory; and
a processor coupled to the memory, the processor configured to cause the mobile terminal to execute processes of:
  receiving control information for MBMS (Multimedia Broadcast Multicast Service), the control information broadcasted from a cell,
  receiving MBMS data broadcasted from the cell,
  determining whether or not to continue a reception of the MBMS data in the cell, based on a state of service with which the mobile terminal is provided by the cell, when the mobile terminal receives, in a connected state, the MBMS data, wherein the state of service includes at least one of an amount of the MBMS data, an amount of the user data other than the MBMS data, and a suspension of the broadcasting of the MBMS data, and
  transmitting, to a radio base station that manages the cell, information based on a result of determining whether or not to continue the reception of the MBMS data in the cell, wherein the information indicates the mobile terminal has an interest in receiving the MBMS data, and wherein the information includes MBMS frequency on which the mobile terminal receives the MBMS data.

* * * * *